(12) United States Patent
Cui

(10) Patent No.: US 6,878,803 B2
(45) Date of Patent: Apr. 12, 2005

(54) METHOD FOR NITRATING AND AMINATING AN ARYL POLYMER

(75) Inventor: Wei Cui, Blaustein (DE)

(73) Assignee: Celanese Ventures GmbH (DE)

(*) Notice: Subject to any disclaimer, the term of this patent is extended or adjusted under 35 U.S.C. 154(b) by 25 days.

(21) Appl. No.: 10/220,171

(22) PCT Filed: Mar. 1, 2001

(86) PCT No.: PCT/EP01/02341

§ 371 (c)(1),
(2), (4) Date: Jan. 13, 2003

(87) PCT Pub. No.: WO01/64773

PCT Pub. Date: Sep. 7, 2001

(65) Prior Publication Data

US 2003/0166792 A1 Sep. 4, 2003

(30) Foreign Application Priority Data

Mar. 2, 2000 (DE) .......................................... 100 10 002

(51) Int. Cl.⁷ .................. C08G 75/00; C08G 65/00; C08F 6/06
(52) U.S. Cl. .................. 528/486; 528/491; 528/492; 528/499; 528/502 R; 528/503; 528/86; 528/373; 528/422
(58) Field of Search .................. 528/486, 491, 528/492, 499, 502 R, 503, 86, 373, 422

(56) References Cited

U.S. PATENT DOCUMENTS 3,715,323 A * 2/1973 Crivello .................. 525/359.4

FOREIGN PATENT DOCUMENTS

| DE | 19813613 | * | 9/1999 |
| EP | 0325405 | * | 7/1989 |

OTHER PUBLICATIONS

Karcha et al; Preparation and characterization of nitrated poly(aryl ether ketone); 1995, Pure Appl. Chem., A32(5), pp. 957–967.*

* cited by examiner

Primary Examiner—Duc Truong
(74) Attorney, Agent, or Firm—Robert H. Hammer, III, P.C.

(57) ABSTRACT

The invention relates to a novel and inexpensive process for the nitration and amination of aryl polymers and also to their use as blend components for producing polymer blend membranes. Such polymer blend membranes are used in membrane processes, in particular as polymeric electrolyte in electromembranes, e.g. for electrodialysis and fuel cells.

14 Claims, 2 Drawing Sheets

FTIR spectra of PES, PES-NO₂ and PES-NH₂

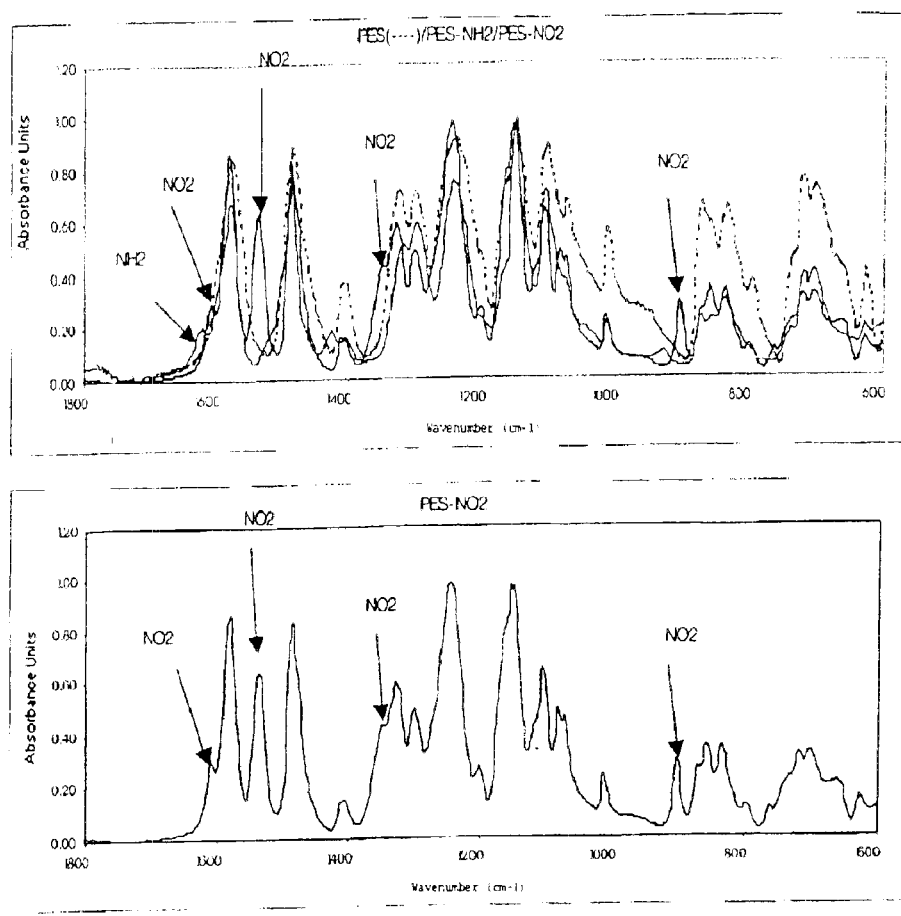
Figure 1 FTIR spectra of PES, PES-NO₂ and PES-NH₂

Figure 2. FTIR spectra of PES and PES-NH$_2$-50
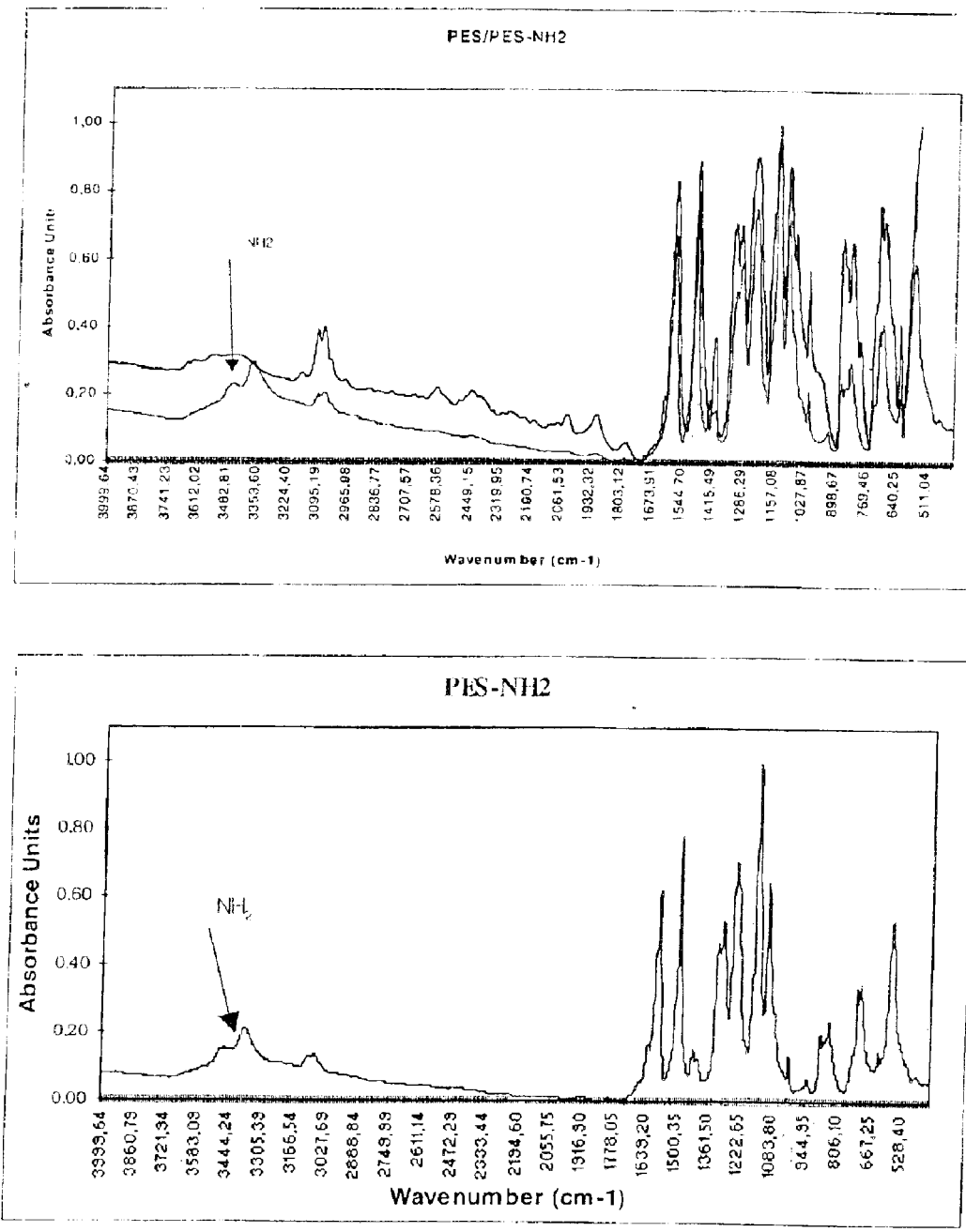

METHOD FOR NITRATING AND AMINATING AN ARYL POLYMER

The invention relates to a novel and inexpensive process for the nitration and amination of aryl polymers and also to their use as blend components for producing polymer blend membranes. Such polymer blend membranes are used in membrane processes, in particular as polymeric electrolyte in electromembranes, e.g. for electrodialysis and fuel cells.

The nitration and amination of aryl polymers is known per se. Thus, Karcha et al [J. Macromol. Sci.-Pure Appl. Chem., A32(5), 957–967 (1995)] describe the dissolution of polyether ether ketone (PEEK) in methane sulfonic acid and subsequent nitration by addition of concentrated nitric acid. The methanesulfonic acid used here as solvent is relatively expensive.

The nitrations of aryl polymers using ammonium nitrate and trifluoroacetic anhydride as carried out by Crivello [J. Org. Chem., 46, 3056 (1981)] and Daly [Chemical Reactions in Polymers, J. L. Benham and J. F. Kinstle (eds.), ACS Symp. Ser.; 364 (1988)] are difficult to implement in industrial processes because of the explosion risk associated with ammonium nitrate.

Naik et al [Naik, H. A.; Parsons, I. W.; McGrail, P. T.; MacKenzie, P. D.: Polymer, Vol. 32, 140–145 (1991)] describe the preparation and characterization of aminated polyether sulfone (PES) and polyether ether sulfone (PEES). To prepare the aminated polymer, nitrated polymer is firstly prepared by nitration using $HNO_3/H_2SO_4$ in nitrobenzene as solvent. The nitrated polymer is then reduced by means of sodium dithiosulfate ($Na_2S_2O_4$) in dimethylformamide (DMF). A disadvantage of this process is the toxicity of the nitrobenzene solvent.

In the European patent application 19813613.7, nitrated PES is prepared by addition of nitric acid in concentrated sulfuric acid. However, the temperature in the reaction is too high. According to the literature, PES decomposes in concentrated sulfuric acid at elevated temperature.

There is therefore a considerable need for an economical process for preparing nitrated or aminated aryl polymers.

The present invention provides a process for preparing a nitrated aryl polymer, which comprises the steps:

a) dissolving aryl polymer in concentrated sulfuric acid at temperatures below 25° C.

b) adding concentrated nitric acid at temperatures below 25° C.

c) precipitating the resulting nitrated aryl polymer in water and separating off the precipitated nitrated aryl polymer.

The product obtained in step c) is subsequently freed of adhering acid by washing a number of times.

After addition of the nitric acid is complete, the reaction mixture can be stirred for a period of up to several hours, preferably up to 10 hours, at temperatures below 25° C. before step c) is carried out. The temperature can be varied during this time, but 25° C. should not be exceeded.

The aryl polymer is preferably dissolved in concentrated sulfuric acid at 0–5° C. The nitration by addition of concentrated nitric acid is preferably carried out at from 5 to 25° C.

The concentration of the sulfuric acid is at least 95% by weight, preferably 97% by weight. The concentration of the nitric acid is preferably from 65% by weight to 100% by weight.

For the purposes of the present invention, aryl polymers are polymers comprising aromatic building blocks selected from the group consisting of

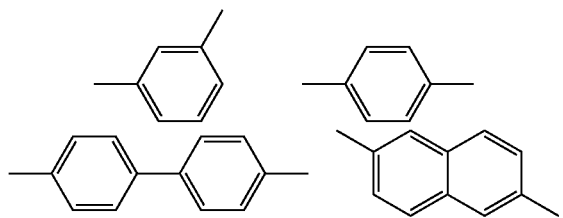

and thermally stable linking units selected from the group consisting of

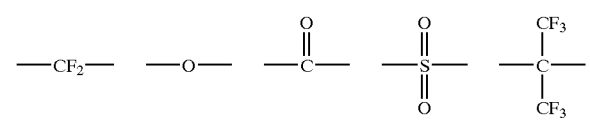

Preference is given to using polyether sulfone (PES), polyether ether sulfone (PEES), polyether ketone (PEK), polyether ether ketone (PEEK) and polyether ether ketone ketone (PEEKK) as aryl polymer.

In this process of the invention, only inexpensive bulk chemicals such as sulfuric acid and nitric acid are used.

The invention further provides for the subsequent reduction of the nitrated aryl polymer to give an aminated aryl polymer.

For this purpose, the nitrated aryl polymer obtained in step c) is firstly freed of adhering acid. If this has already been removed in the course of the separation carried out in step c), this step can be omitted. The nitrated aryl polymer is subsequently dissolved in an aprotic polar solvent and the nitro group is reduced by means of a reducing agent to give the amine.

The following scheme indicates the course of the process of the invention:

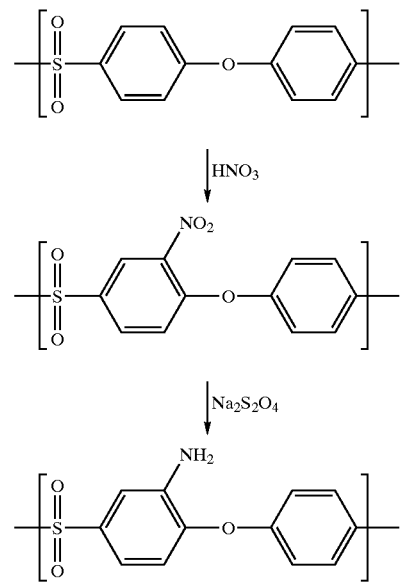

The aprotic polar solvent used is, in particular, dimethylformamide (DMF), dimethyl acetate (DMAc), dimethyl sulfoxide (DMSO), or N-methylpyrrolidone (NMP).

As reducing agent, it is possible to use all customary substances which reduce a nitro group to an amine. Preference is given to using sodium dithionite ($Na_2S_2O_4$). The reaction is carried out at temperatures of from 60 to 180° C., preferably from 80 to 150° C., in particular from 100 to 120° C.

The nitrated aryl polymer can also be sulfonated. This results in a block copolymer having both SO₃H groups and

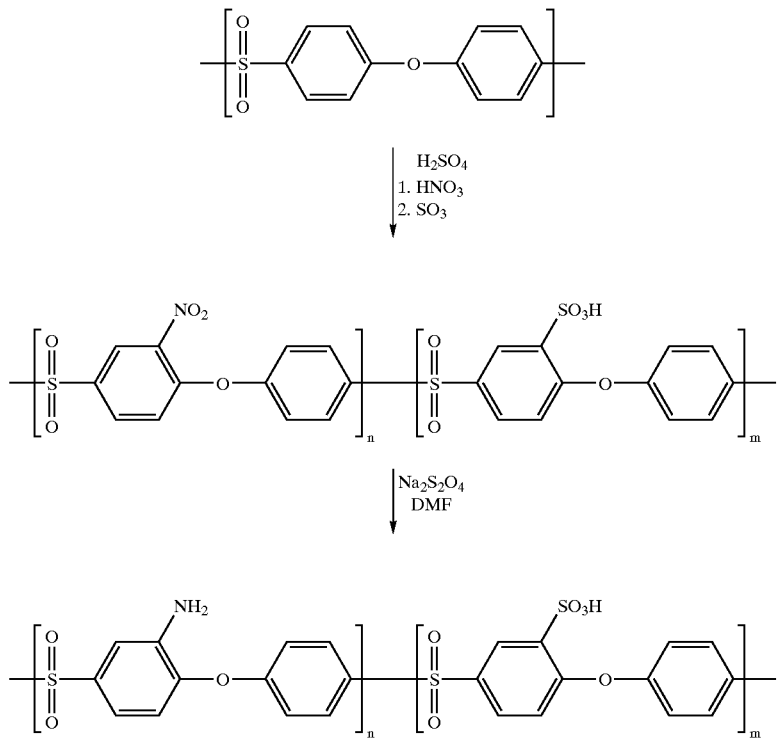

NO₂ groups. Furthermore, the block copolymer can be aminated as described in the European patent application 19813613.7.

In this process according to the invention, the sulfonation of the nitrated aryl polymer is carried out at a temperature lower than that described in the German patent application 19959289.6 so that there is no risk of the polymer chain being degraded during the reaction.

The sulfonation is carried out in the presence of an anhydride of a carboxylic acid by addition of a sulfonating agent at a temperature below 25° C. and for a time which is sufficient to achieve the desired degree of sulfonation.

A wide variety of carboxylic anhydrides can be used. Apart from linear anhydrides, cyclic anhydrides can also be used.

Examples are anhydrides of aliphatic monocarboxylic acids such as formic, acetic, propionic, butyric and caproic acids, anhydrides of aliphatic or ethylenically unsaturated aliphatic dicarboxylic acids such as malnic acid, succinic acid or lactic acid, anhydrides of cycloaliphatic carboxylic acids, such as cyclohexanecarboxylic acid, anhydrides of aromatic monocarboxylic or dicarboxylic acids, e.g. benzoic acid, phthalic acid, isophthalic acid or terephthalic acid. It is also possible to use anhydrides made up of different carboxylic acid units.

Furthermore, trifluoroacetic anhydride $(CF_3CO)_2O$ or trichloroacetic anhydride $(CCl_3CO)_2O$ can also be used.

Particular preference is given to using acetic anhydride and trifluoroacetic anhydride.

The sulfonating agent used can be any sulfonating agent which is able to sulfonate the aromatic polymer backbone under the reaction conditions. Examples are oleum, concentrated sulfuric acid, chlorosulfonic acid.

Preference is given to chlorosulfonic acid or oleum, in particular 20% strength oleum.

The indices m and n are identical or different and are each a number in the range from 1 to 100.

The invention also provides substituted polyether sulfones and substituted polyether ether sulfones both of the formulae (A) and (B) and in the form of corresponding block polymers of the formula (C)

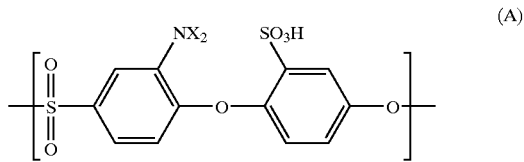

(A)

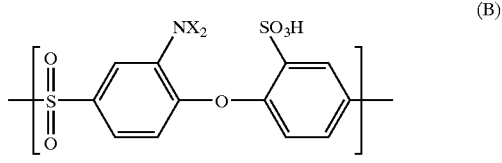

(B)

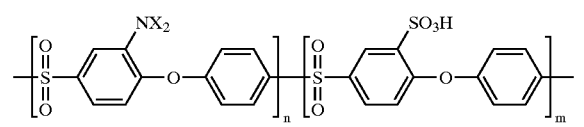

(C)

where X is oxygen or hydrogen and m and n are each a number in the range from 1 to 100.

Examples are given below.

EXAMPLES 1 AND 2

Preparation of Nitrated Polyether Sulfone (PES)

Sulfuric acid was placed in a three-neck double-walled reaction vessel. PES was then dissolved in the sulfuric acid at 0° C. while stirring. Concentrated nitric acid was subsequently added dropwise to the solution at 0–5° C. The reaction solution was stirred at 5° C. for 1 hour, at 10° C. for 2 hours and at 20° C. for 0.5 hour. The polymer was then precipitated in ice/water and washed free of acid. The yield of the nitrated PES is above 95% by weight. Two batches are reported in Table 1.

TABLE 1

Nitration of PES

| Batch | Amount of PES (g) | Dissolution temperature (° C.) | 96% strength $H_2SO_4$ (ml) | Conc. $HNO_3$ (ml) | Target degree of nitration (%) |
|---|---|---|---|---|---|
| PES-$NO_2$-50 | 29 | 0 | 300 | 5.2 | 50 |
| PES-$NO_2$-100 | 50 | 0 | 500 | 16.6 | 100 |

Characterization of PES-$NO_2$-50 and PES-$NO_2$-100
Elemental analysis of PES-$NO_2$-50 and PES-$NO_2$-100

| | PES-$NO_2$-50 | | PES-$NO_2$-100 | |
|---|---|---|---|---|
| Element | Calculated* (%) | Found (%) | Calculated** (%) | Found (%) |
| C | 56.6 | 55.5 | 52 | 49.2 |
| H | 2.9 | 3 | 2.5 | 1.8 |
| S | 12.6 | 12.3 | 11.6 | 10.9 |
| N | 2.8 | 2.6 | 5.1 | 5.2 |
| O | 25.1 | 26.5 | 28.9 | 30.4 |

*Theoretical structure: $C_{12}H_7 O_3S—(NO_2)_y$; Y = 0.5; Mn = 254.5 g/mol; calculated on the basis of the theoretical structure
**Theoretical structure: $C_{12}H_{7.5} O_3S—(NO_2)_y$; Y = 1.0; Mn = 277 g/mol; calculated on the basis of the theoretical structure

Structure of the Nitrated PES

FIG. 1 shows the FTIR spectra of PES, nitrated and aminated PES (PES-$NO_2$ and PES-$NH_2$). It can be seen from the figure that the absorption bands at 1608 $cm^{-1}$, 1535 $cm^{-1}$, 1346 $cm^{-1}$ and 900 $cm^{-1}$ are assigned to the $NO_2$ vibrations of PES-$NO_2$.

Thermal Properties of PES-$NO_2$

Examination by DSC indicates that the glass transition temperature is 224.4° C.

EXAMPLES 3 AND 4

Preparation of Aminated PES

In a three-necked double-walled reaction vessel, PES-$NO_2$ was dissolved in dimethylformamide (DMF) at R.T. Sodium dithiosulfate ($Na_2S_2SO_4$) was then added to the polymer solution at R.T. under $N_2$ gas. The temperature of the mixture was increased to 120° C. and the mixture was stirred for 5 hours. The temperature of the reaction solution was then reduced to room temperature and the reaction solution was filtered. The polymer was then precipitated in a mixture of methanol and 1N nitric acid solution and washed until neutral. Two batches are reported in Table 3.

TABLE 3

Amination of PES-$NO_2$

| Batch | Amount of PES-$NO_2$ (g) | DMF (ml) | $Na_2S_2SO_4$ (g) | Target degree of amination (%) |
|---|---|---|---|---|
| PES-$NH_2$-50 | 300 | 3500 | 500 | 50 |
| PES-$NH_2$-100 | 40 | 400 | 147.4 | 100 |

Characterization of PES-$NH_2$-50
Elemental analysis of PES-$NH_2$-50

| Element | Calculated* (%) | Found (%) |
|---|---|---|
| C | 60.3 | 57.2 |
| H | 3.3 | 3.5 |
| S | 13.4 | 13.8 |
| N | 2.9 | 2.8 |
| O | 20.1 | 21.8 |

*Theoretical structure: $C_{12}H_8 O_3S—(NH_2)_y$; Y = 0.5; calculated on the basis of the theoretical structure

Structure of the Aminated PES

FIG. 1 and FIG. 2 show the FTIR spectra of PES, nitrated and aminated PES (PES-$NO_2$ and PES-$NH_2$). It can be seen from the figures that the absorption bands at 3330–3400 $cm^{-1}$ and 1619 $cm^{-1}$ are assigned to the $NH_2$ vibrations of PES-$NH_2$.

Thermal Properties of PES-$NH_2$-50

Examination by DSC and TGA indicates that the Tg is 236.6° C. and the decomposition temperature is above 350° C.

What is claimed is:

1. A process for preparing a nitrated aryl polymer comprises the steps of:
   a) dissolving aryl polymer in concentrated sulfuric acid at a temperature below 25° C.
   b) adding concentrated nitric acid at a temperature below 25° C.
   c) precipitating the resulting nitrated aryl polymer in water and separating off the precipitated nitrated aryl polymer, and
   d) sulfonating the nitrated aryl polymer by addition of a sulfonating agent in the presence of an anhydride of a carboxylic acid wherein the sulfonating step is carried out at a temperature below 25° C.

2. The process according to claim 1, further comprising washing a number of times the nitrated aryl polymer obtained in step c) until freed of adhering acid.

3. The process according to claim 1, further comprising stirring the reaction mixture at temperatures below 25° C. for a further period of up to 10 hours after the addition of nitric acid is complete and before step c) is carried out.

4. The process according to claim 1, further comprising dissolving the aryl polymer in concentrated sulfuric acid at temperatures of from 0 to 5° C.

5. The process according to claim 1, wherein the nitration is carried out at temperatures of from 5 to 25° C.

6. The process according to claim 1, wherein the aryl polymer comprises aromatic building locks selected from the group consisting of

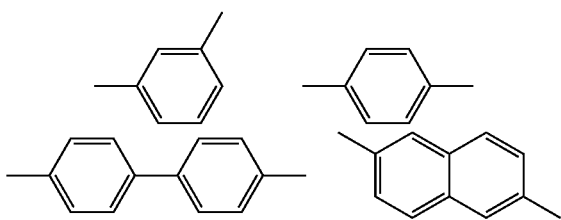

and thermally stable linking units selected from the group consisting of

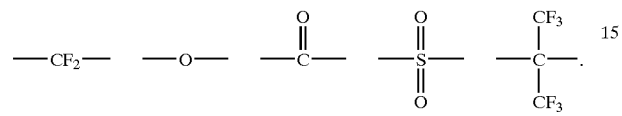

7. The process according to claim 6, wherein the aryl polymer further comprises polyether sulfone (PES), polyether ether sulfone (PEES), polyether ketone (PEK), polyether ether ketone (PEEK) or polyether ether ketone ketone (PEEKK).

8. The process according to claim 1, further comprising dissolving the nitrated aryl polymer obtained in step c) in an aprotic polar solvent and reducing same by means of a reducing agent thereby giving an aminated aryl polymer.

9. The process according to claim 8, wherein the aprotic polar solvent being selected from the group consisting of dimethylformamide (DMF), dimethylacetate (DMAc), dimethyl sulfoxide (DMSO) or N-methylpyrrolidone (NMP).

10. The process according to claim 8, wherein the reducing agent being sodium dithionite ($Na_2S_2O_4$).

11. The process according to claim 8, wherein reducing being carried out at temperatures of from 60 to 180° C.

12. The process according to claim 1, wherein block polymers are obtained.

13. A substituted polyether sulfone or substituted polyether ether sulfone of the formulae (A) and (B) or in the form of a corresponding block polymer of the formula (C)

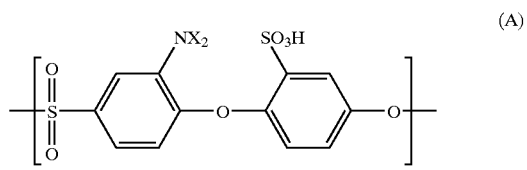

(A)

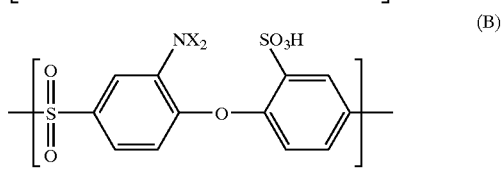

(B)

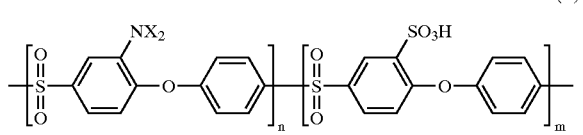

(C)

where X is oxygen or hydrogen and m and n are each a number in the range from 1 to 100.

14. A blend component for producing blend membranes for membrane processes such as fuel cells, for filtration and/or gas separation which is made by the process as claimed in claim 1.

* * * * *